No. 615,649. Patented Dec. 6, 1898.
J. W. DAWSON.
POCKET RATCHET BRACE FOR SCREW DRIVERS, &c.
(Application filed May 25, 1898.)
(No Model.)
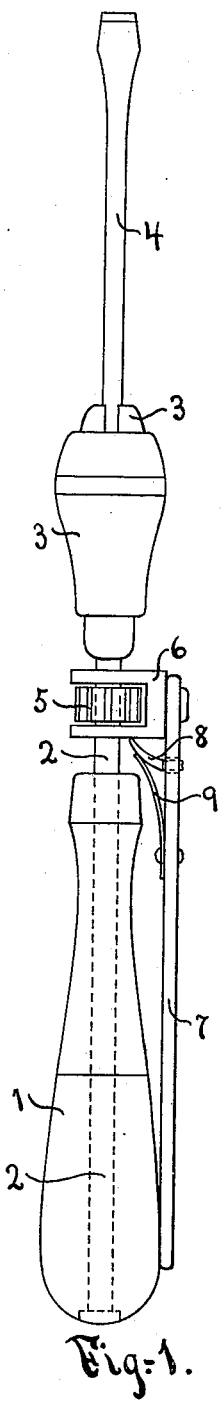
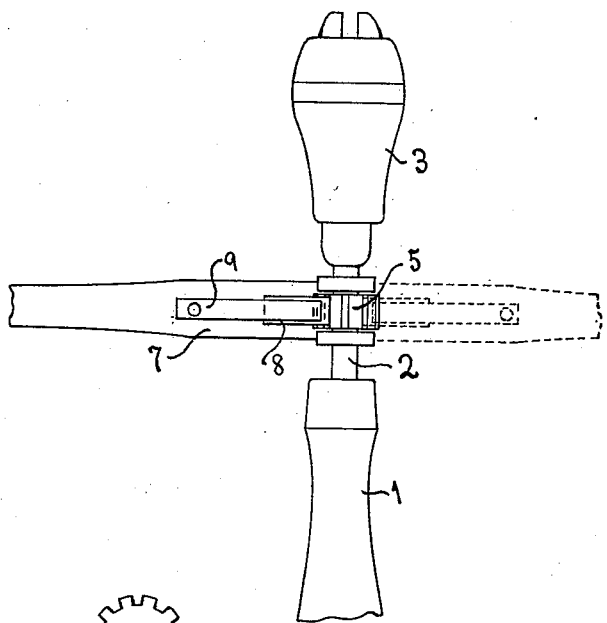
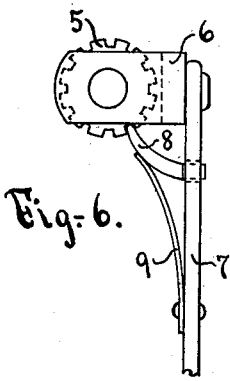
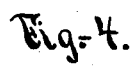
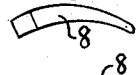
Witnesses:-
A. T. Fay
E. G. Porter
Inventor:-
James W. Dawson.
By Chas. S. Cairns
his Atty.

UNITED STATES PATENT OFFICE.

JAMES W. DAWSON, OF MINNEAPOLIS, MINNESOTA, ASSIGNOR TO GEORGE T. HONSTAIN, OF SAME PLACE.

POCKET RATCHET-BRACE FOR SCREW-DRIVERS, &c.

SPECIFICATION forming part of Letters Patent No. 615,649, dated December 6, 1898.

Application filed May 25, 1898. Serial No. 681,720. (No model.)

*To all whom it may concern:*

Be it known that I, JAMES W. DAWSON, a citizen of the United States, residing at Minneapolis, in the county of Hennepin and State of Minnesota, have invented a new and useful Improvement in Pocket Ratchet-Braces for Screw-Drivers and Similar Tools, of which the following is a specification.

My invention relates to improvements in pocket ratchet-braces for screw-drivers, hand-drills, and similar tools where a revolving motion is required in using them; and the object of my improvement is to provide means whereby a convenient leverage power may be readily brought into use to produce a revolving motion of the tool in either direction and which may be folded up to put in the pocket. I attain these objects by the mechanism illustrated in the accompanying drawings, in which—

Figure 1 is an elevation of the entire tool with a screw-driver adjusted therein. Fig. 2 is an elevation of the same with parts broken away and the hand-lever swung into position for use. Fig. 3 is a detail showing the ratchet-wheel. Figs. 4 and 5 are details showing, respectively, an edge and plan view of the dog which operates with the ratchet-wheel. Fig. 6 is a detail showing a plan view of the cross-head.

The handle 1 receives and is secured rigidly to the shank 2. At the outer end of the shank is secured the ordinary clamping mechanism 3, adapted to removably receive and hold a screw-driver 4 or such other tool as it may be desired to use. A ratchet-wheel 5 is rigidly secured at its axis upon the shank 2 and is received between the branches of the cross-head 6, which cross-head is loosely pivoted upon the shank 2. To the outer end of the cross-head 6 is loosely secured one end of a hand-lever 7. A dog 8 is loosely secured at one end to the hand-lever, while a spring 9, rigidly secured at one end also to the hand-lever, presses upon said dog.

When the hand-lever 7 is in the position shown in Fig. 1, the tool is folded to place in the user's pocket or may be used after the manner of an ordinary screw-driver; but when the hand-lever is turned to the position shown by full lines in Fig. 2 the dog 8 is pressed into a notch of the ratchet-wheel 6 by the spring 9, so that when said lever, being so at right angles to the shank 2, is turned to the right it forces the revolution of the tool to the right, while when said lever is turned to the left said dog 8 rises out of such notch and engages in a notch of the ratchet-wheel farther to the left in the circumference of such wheel in the usual manner of ratchet-dogs. When said lever is brought again to the position shown in Fig. 1 and is then swung in the opposite direction to that first described, to the position shown by dotted lines, Fig. 2, the operation of the tool is reversed, so that the power exerted upon said lever will serve to revolve the tool to the left. Thus the ratchet may be made to work right or left by simply swinging the lever 7 to the right or left from the handle to a position at right angles to the shank. When desired, the clamping mechanism 3 may be omitted, and the screw-driver 4 or other similar tool will then be a continuation of the shank 2.

In many employments it is essential to have such a tool for the workman to carry in his pocket, which cannot be done with the ordinary braces in use; but unless he can exert more force than the ordinary handle 1 will enable him to exert he will be at a great disadvantage and will often be unable to accomplish what he desires. This difficulty is removed by the tool here presented.

When desired, the outer end of the handle 1 may be made to turn freely on the shank 2, as is usually the case with ordinary braces.

What I claim as new, and desire to secure by Letters Patent, is—

1. In a pocket ratchet-brace, the combination of a shank a suitable handle thereon, a ratchet-wheel mounted on said shank, a cross-head which turns freely upon the shank and carries a hand-lever with it, said hand-lever loosely mounted adjacent to said ratchet-wheel, a spring-dog mounted upon said lever and adapted to engage said ratchet-wheel when the lever is swung to a position at right angles to said shank, said lever being adapted to fold up in a position parallel to and upon the handle, substantially as set forth.

2. In a pocket ratchet-brace, the combination of a shank, a handle at one end of said shank, the cross-head which revolves freely upon the shank and carries a hand-lever with it, a ratchet-wheel, a dog and said hand-lever so mounted together and upon the parts of said brace, as to form a ratchet adapted to operate to right or left, said hand-lever being adapted to transmit power exerted thereon to and through said ratchet to revolve a tool and said lever being further adapted to fold up in a position in line with said shank, substantially as shown and described.

3. In a pocket ratchet-brace, a shank, having secured thereto a handle at one end and a tool-clamping mechanism at the other, and having a ratchet-wheel secured to it at a point between the handle and the clamping mechanism, combined with a cross-head which is pivoted upon the shank, and which embraces the ratchet-wheel, a hand-lever pivoted upon the cross-head and provided with a spring-actuated pawl which engages with the ratchet-wheel, the pawl being adapted to sweep over the outer side of the cross-head when the lever is turned upon its pivot, and thus made to engage the ratchet-wheel from either side of the cross-head, substantially as set forth.

JAMES W. DAWSON.

Witnesses:
　CHAS. S. CAIRNS,
　E. G. PORTER.